United States Patent
Jenkins et al.

(10) Patent No.: US 9,531,613 B2
(45) Date of Patent: *Dec. 27, 2016

(54) MODIFYING NETWORK SITE BEHAVIOR USING SESSION-LEVEL PERFORMANCE METRICS

(71) Applicant: Amazon Technologies, Inc., Seattle, WA (US)

(72) Inventors: Jonathan A. Jenkins, Seattle, WA (US); John M. Rauser, Seattle, WA (US); William A. Strand, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,995

(22) Filed: Mar. 27, 2015

(65) Prior Publication Data

US 2015/0207713 A1  Jul. 23, 2015

Related U.S. Application Data

(63) Continuation of application No. 12/640,326, filed on Dec. 17, 2009, now Pat. No. 8,996,699.

(51) Int. Cl.
| | |
|---|---|
| *H04L 12/26* | (2006.01) |
| *H04L 29/08* | (2006.01) |
| *H04L 29/06* | (2006.01) |

(52) U.S. Cl.
CPC ......... *H04L 43/0852* (2013.01); *H04L 67/101* (2013.01); *H04L 67/142* (2013.01); *H04L 67/2823* (2013.01); *H04L 67/32* (2013.01); *H04L 67/42* (2013.01); *H04L 69/28* (2013.01); *H04L 67/02* (2013.01); *H04L 67/14* (2013.01)

(58) Field of Classification Search
CPC ............ G06F 17/30902; G06F 17/3089; H04L 43/0852; H04L 67/101; H04L 67/142; H04L 67/2823; H04L 67/32; H04L 67/42; H04L 67/02; H04L 67/14; H04L 69/28
USPC ................................ 709/223, 224, 232, 235
See application file for complete search history.

(56) References Cited

U.S. PATENT DOCUMENTS

| | | |
|---|---|---|
| 6,601,098 B1 | 7/2003 | Case et al. |
| 6,665,872 B1 * | 12/2003 | Krishnamurthy .. H04N 21/2365 375/240.26 |
| 7,634,562 B2 | 12/2009 | Litofsky et al. |
| 7,979,549 B2 | 7/2011 | Frost et al. |
| 8,000,259 B2 | 8/2011 | Mills et al. |
| 8,151,269 B1 | 4/2012 | Brown et al. |
| 8,180,921 B2 | 5/2012 | Maynard |

(Continued)

*Primary Examiner* — Viet Vu
(74) *Attorney, Agent, or Firm* — Thomas | Horstemeyer, LLP

(57) ABSTRACT

Disclosed are various embodiments for modifying network site behavior. At least one session-level performance metric associated with a client is determined. The one or more session-level performance metrics are determined from one or more latency times. Each one of the latency times represents a time elapsed between a sending of a network page request in the client and a rendering in the client of a network page received from a network page server in response to the network page request. A response to a next network page request from the client is modified according to the one or more session-level performance metrics in order to adjust a next latency time for the client.

20 Claims, 3 Drawing Sheets

(56) References Cited

U.S. PATENT DOCUMENTS

| | | |
|---|---|---|
| 2004/0064531 A1 | 4/2004 | Wisner |
| 2006/0206586 A1 | 9/2006 | Ling et al. |
| 2010/0131352 A1 | 5/2010 | Malhotra et al. |
| 2010/0228824 A1* | 9/2010 | Lin .................... H04L 12/1818 709/204 |
| 2010/0299349 A1 | 11/2010 | Greenberg et al. |

* cited by examiner

MODIFYING NETWORK SITE BEHAVIOR USING SESSION-LEVEL PERFORMANCE METRICS

This application is a continuation of, and claims priority to, co-pending U.S. Patent Application entitled "MODIFYING NETWORK SITE BEHAVIOR USING SESSION-LEVEL PERFORMANCE METRICS," filed on Dec. 17, 2009, assigned application Ser. No. 12/640,326, issued on Mar. 31, 2015, and assigned U.S. Pat. No. 8,996,699, which is incorporated herein by reference in its entirety.

BACKGROUND

In recent years, broadband has quickly replaced dial-up as the primary method for accessing the Internet. One consequence of this broadband communications revolution is that Internet users have now come to expect fast performance from network sites. With a high-speed broadband network connection, a user may quickly become frustrated with a network site that is slow to load.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
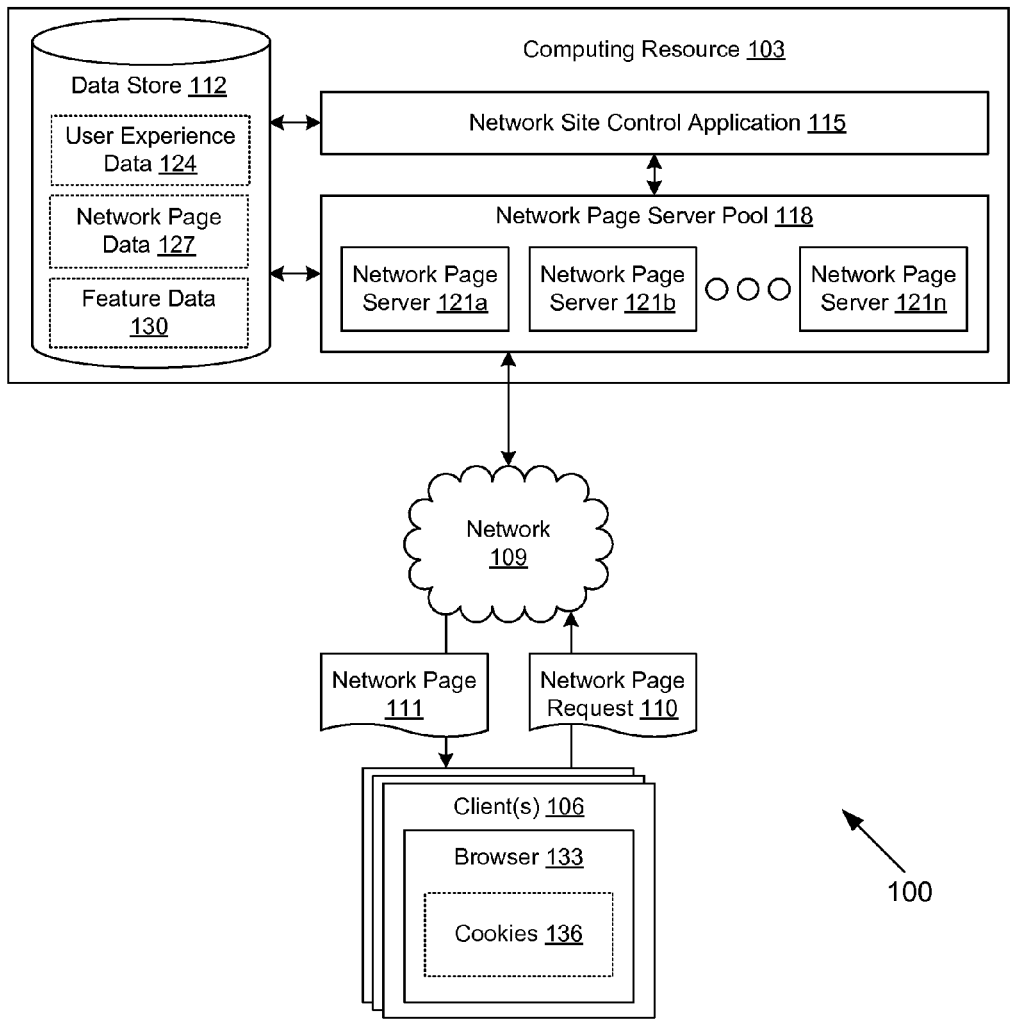
FIG. 1 is a drawing of a networked environment according to various embodiments of the present disclosure.

Disclosed are various embodiments for modifying network site behavior in order to improve user experience. Given the present proliferation of broadband network access, users are likely to be frustrated when they request a network page, such as a web page, and the network page loads slowly. It has been observed that users overlook or discount one slow network page load. The users may, for example, attribute the slow load to an intermittent error or some malfunction occurring on their own computer. However, when a user experiences several slow network page loads from a network site over the course of a session, the user may become frustrated and navigate away from the offending network site. Consequently, when the network site is operated by an online retailer, the user experiencing repeated slow loads may decide to buy elsewhere. Additionally, if the user is placing an order through such a network site and a network page loads slowly, the user may feel that the purchase is more risky due to a potential malfunction.

It has been observed that if a user experiences more fast network page loads than slow network page loads, the user generally is having a positive experience with the network site. As a non-limiting example, if at least half, or some other predetermined ratio, of the network page requests from the user result in fast loads, the user may regard the experience as positive. If at least half of the network page requests result in slow loads, the user may regard the experience as negative. Consequently, a user browsing a network site of an online retailer may be less likely to order items from the online retailer when half or more of the network page requests result in slow loads.

In the various embodiments disclosed herein, the behavior of a network site is modified based on aggregate session-level performance. Specifically, session-level performance relates to performance observed by the user during a session of accessing the network site. Such a session may last for any time period. Sessions may, for example, be reset after a period of inactivity (e.g., 90 minutes). As a non-limiting example, the various embodiments disclosed herein may serve up a lighter network page, route the user to another server, or take some other action to improve response time for users experiencing poor aggregate session-level performance. As another non-limiting example, the various embodiments disclosed herein may serve up a heavier network page, route the user to another server, or take some other action resulting in a slower response time for users experiencing very good aggregate session-level performance.

Whether a network page is considered to load "fast" or "slow" may be determined relative to one or more predetermined thresholds. Such thresholds may be determined, for example, by referring to historical data, conducting experiments, or in some other manner. As a non-limiting example, an analysis may be conducted of logged historical data (e.g., item purchases, page views, etc.) associated with a network site to determine that a certain page loading time is fast or slow. As another non-limiting example, a network site may be controlled to provide predefined page loading times, and users may be asked to indicate whether they believe that the page loading, or latency, time is fast or slow. Certain portions of a network site may be associated with differing thresholds based on differing user expectations. For example, a user may consider an order checkout page to be slow loading sooner than a video-on-demand page.

As used herein, the terms "light" and "heavy" refer to relative measures that are associated, for example, with a data size of a network page that includes multimedia content, with a quantity of features embedded within a network page, with resources required to generate network pages or render network pages for display, and/or with any other measure of the latency time of a network page in a browser. As non-limiting examples, a lightweight network page may include only basic graphics and text information, while a heavyweight network page may include videos, sounds, and features that are processing-intensive to generate. In the following discussion, a general description of the system and its components is provided, followed by a discussion of the operation of the same.

With reference to FIG. 1, shown is a networked environment 100 according to various embodiments. The networked environment 100 includes a computing resource 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks. A client 106 sends one or more network page requests 110 to the computing resource 103 via the network 109 and receives one or more network pages 111 from the computing resource 103 in response.

The computing resource 103 may comprise, for example, a server computer or any other computing device or system providing computing capability. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. In one embodiment, the computing resource 103 represents a virtualized computer system executing on one or more physical computing systems. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a data store 112 that is accessible to the computing resource 103. The data store 112 may be representative of a plurality of data stores as can be appreciated. The data stored in the data store 112, for example, is associated with the operation of the various applications and/or functional entities described below.

The components executed on the computing resource 103 include, for example, a network site control application 115, a network page server pool 118, and other applications, services, processes, systems, engines, or functionality not discussed in detail herein. The network site control application 115 is executed to control the behavior of one or more network sites hosted by, or otherwise associated with, the computing resource 103, to monitor the performance of the network site(s) for users, and to route network page requests 110 from users to a specific network page server 121 within the network page server pool 118. It is understood that the functionality of the network site control application 115 may be performed by any number of applications executing on one or more computing devices comprising the computing resource 103. Although multiple network sites may be controlled and/or hosted by computing resource 103, such network sites will be referred to in the singular hereafter for clarity of expression.

The network page server pool 118 includes a plurality of network page servers 121, depicted as network page servers 121a, 121b . . . 121n. Each of the network page servers 121 may be configured to serve up network pages 111 of the network site to users at clients 106. Further, network page servers 121 may be geographically distributed to provide better performance to clients 106 located in a specific geographic area. Each network page server 121 may comprise, for example, a hypertext transfer protocol (HTTP) server application such as Apache™ HTTP Server, Microsoft® Internet Information Server, or some other application configured to serve up network pages 111.

The data stored in the data store 112 includes, for example, user experience data 124, network page data 127, feature data 130, and potentially other data. The user experience data 124 may be generated, for example, by the network site control application 115, and may contain data related to the performance of the network site for particular clients 106. Where the network page server 121 comprises an HTTP server, the user experience data 124 may include, for example, logs of HTTP requests.

The user experience data 124 may also include, for example, latency times, with each latency time representing at least a portion of a time elapsed between a sending of a network page request 110 by a client 106 and a rendering in a client 106 for display of a network page 111 received from one of the network page servers 121 in response to the network page request 110. Such latency time data may be computed at least in part, for example, by timer code executing on the client 106 or on the computing resource 103. The latency time data computed by the client 106 or otherwise stored on the client 106 may be sent via the network 109 to the computing resource 103 for storage in user experience data 124.

Network page data 127 corresponds to data used in generating network pages 111 that are being served up by the network site associated with a computing resource 103. To this end, network page data 127 may comprise network pages 111 written in hypertext markup language (HTML), extensible language (XML), and/or any other language suitable for describing network page data 127. In some embodiments, network page data 127 may comprise templates with placeholders for content to be inserted when the network page 111 is generated in the network page server 121 and sent to the client 106 in response to a network page request 110. In other embodiments, network page data 127 may comprise code used to generate network pages 111 or portions of network pages 111.

Feature data 130 includes data relating to features that may be incorporated within a network page 111. Such features may include lists of items available for order; reviews of items; animations, videos, sounds, images and/or other multimedia content; and/or any other form of content that may be statically or dynamically generated in response to a network page request 110. Feature data 130 may include code to generate a feature in HTML or another markup language. To this end, feature data 130 represents any data that may be used in generating such a feature.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 133 and/or other applications. The browser 133 may be executed in a client 106, for example, to access and render network pages 111, such as web pages, or other network content served up by the computing resource 103 and/or other servers. The browser 133 may store data related to user sessions for a network site, for example, using cookies 136. Cookies 136 provide a mechanism for a network page server 121 to store a token and/or other data on a client 106. It is understood that the client 106 may provide alternative mechanisms for storing data from the network page server 121 other than cookies 136. Cookies 136, however, provide a standardized mechanism for a network page server 121 to retrieve data from a client 106 that has been previously stored by the network page server 121 or other network page servers 121 within the network page server pool 118 that are associated with the network site. The client 106 may be configured to execute applications beyond browser 133 such as, for example, email applications, instant message applications, and/or other applications.

Next, a general description of the operation of the various components of the networked environment 100 is provided. To begin, a user at a client 106 sends a network page request 110 over the network 109 to a network site hosted on the computing resource 103. In various embodiments, a computing resource 103 may host a plurality of network sites. A network site may comprise, for example, a set of network pages 111 accessible under a domain name.

The network site control application 115, or some other gateway application, may intercept the network page request 110 and assign the network page request 110 to one or more of the network page servers 121 in the network page server pool 118. In other embodiments, the network page request 110 from the client 106 may be routed to a default network page server 121. In still another embodiment, the network page request 110 from the client 106 may be routed to a network page server 121 based on an assignment defined within the domain name service mapping corresponding to the domain name of the network site.

The network page server 121 assigned to respond to the network page request 110 then generates the network page 111 corresponding to the network page request 110. In some embodiments, the network page server 121 may simply retrieve a static network page 111 from the network page data 127 in the data store 112 and return the network page 111 to the client 106 over the network 109, where the network page 111 is unmodified. In other embodiments, the network page server 121 may dynamically generate the network page 111 including dynamic content. Such a dynamic network page 111 may include one or more features generated from feature data 130. In generating the dynamic network page 111, the network page server 121 may communicate with one or more other applications executing on the computing resource 103 in order to generate the content corresponding to the feature data 130.

Ultimately the network page server 121 returns the network page 111 to the client 106 in response to the network page request 110. The latency time associated with the sending of the network page request 110 and receipt at the client 106 at the network page 111 in response to the network page request 110 may include several components. As a non-limiting example, a latency time may include a server side latency component, a client side latency component, a network latency component, and/or other components. As a non-limiting example, a server side latency component may be determined as the time elapsed between receiving a network page request 110 at a network page server 121 and the generating of a network page 111 in response to the network page request 110.

Although various components of the latency time may be determined at the computing resource 103, it may be preferable to calculate the latency time at the client 106. In one embodiment, the network page 111 sent to the client 106 may include code that calculates the latency time or various components of the latency time. The latency time may be calculated in the client 106, for example, by determining when the network page request 110 was first sent and determining when the network page 111 served up by the network page server 121 has been rendered for display in the browser 133. Accordingly, the browser 133 may provide the latency time to the network page server 121 and the latency time may be stored, for example, within the user experience data 124 on the computing resource 103. Alternatively, or additionally, the latency time may be stored within the cookies 136 or some other storage area in the client 106 by the network page server 121. In such cases, the network page server 121 may be able to retrieve the latency time from the browser 133 or the client 106 by requesting to read a cookie 136 corresponding to the network site.

Over the course of a session, which may last, for example, for a few minutes to a few hours or a day, a user requests a plurality of network pages 111 from the computing resource 103. From these network page requests 110 and from the network pages 111 sent in response, one or more latency times are determined for the client 106. The network site control application 115 may be configured to process the latency times and to determine one or more session-level performance metrics associated with the respective client 106. From the session-level performance metrics, the network site control application 115 may take action, if needed, to adjust the network site behavior to improve the experience of users. As a non-limiting example, the network site control application 115 may modify the generation of the network page 111 to include additional reassurance for the user.

As another non-limiting example, the network site control application 115 may modify a response to a subsequent network page request 110 from the client 106 according to one or more session-level performance metrics in order to adjust a subsequent latency time for the client 106. In various embodiments, the subsequent latency time may be adjusted to be reduced or increased, if a change is deemed necessary by the network site control application 115. In order to reduce a subsequent latency time, the network site control application 115 may assign a greater priority to the network page request 110 within the computing resource 103. To this end, the priority may be indicated to other applications within the computing resource 103 by flagging the network page request 110 or using some form of out-of-band communication.

According to such a priority, the network site control application 115 may assign the network page request 110 to a network page server 121 with additional capacity, bandwidth, processing time, and/or other resources such that the particular network page server 121 may be equipped to respond more quickly to the network page request 110 than other network page servers 121 within the network page server pool 118. In various embodiments, the network site control application 115 may adjust various network 109 parameters related to the connection between the network page server 121 and the client 106. As a non-limiting example, the network site control application 115 may enable the urgent flag and/or modify other parameters associated with the transmission control protocol (TCP) connection between the network page server 121 and the client 106.

Furthermore, the network site control application 115 may route the network page request 110 to a specific network page server 121 based at least in part on a geographic location associated with the client 106. In such a case, the assigned network page server 121 may be geographically closer to the client 106 than other network page servers 121 that had been responding to network page requests 110 from the client 106. A network page server 121 that is geographically closer to the client 106 may result in less latency over the network 109, increased bandwidth over the network 109, and/or other advantages that may reduce the latency time.

The network site control application 115 may also route the network page request 110 to a specific network page server 121 based at least in part on a cost associated with responding to the network page request 110. Thus, the network site control application 115 may route the network page request 110 to a more costly network page server 121 only when necessary. As a non-limiting example, different network 109 interfaces may have different bandwidth expenses. As another non-limiting example, a secondary network page server 121 associated with an increased operating cost may be used only when needed to provide additional or backup processing capacity.

Alternatively, or additionally, the network site control application 115 may generate the network page 111 requested by the client 106 taking into account session-level performance metrics. Therefore, when latency times are relatively high over the session, the network site control application 115 may omit certain features from the generated network page 111 that take a relatively long time to generate in the network page server 121 or to send over the network 109 to the client 106.

As a non-limiting example, the network site control application 115 may disable animated advertising banners that otherwise would be included within the network page 111 requested by the client 106. By disabling such banner advertisements, the data size associated with the generated network page 11 may be reduced, thereby reducing the time needed to send the data over the network 109 to the client 106. As another non-limiting example, the network site control application 115 may disable a feature that requires additional processing on the network page server 121. Such a feature may require data to be gathered and processed and/or other time-intensive processing before the feature can be included in the network page 111. By disabling such a feature, the network page 111 may be said to be of a lighter weight, and the latency time for the lighter weight network pages 111 may be reduced.

Alternatively, if the network site control application 115 determines that the session-level performance metric indicates an acceptable user experience (that is, including acceptable latency times), the network site control application 115 may modify the response to a subsequent network page request 110 from the client 106 in order to increase a subsequent latency time for the client 106. It may be desirable, for example, to include one or more features that are particularly compelling but require increased time to generate on the network page server 121. In the case of a network site for an online retailer, the feature may be associated, for example, with increased orders for items. Therefore, when the session-level performance is adequate for a client 106, it may be desirable to generate a heavier weight network page 111, resulting in increased latency times while still maintaining or enhancing user experiences.

As another non-limiting example, when the network site control application 115 determines that the session-level performance metric indicates adequate performance, the network site control application 115 may route the network page request 110 from the client 106 to a different network page server 121 that may be slower to respond to the network page request 110. Although this may result in worsened performance for the client 106, the change may not reduce overall session-level performance to an unacceptable level and may free up other resources to better serve other clients 106.

In various embodiments, the network site control application 115 may modify the network site behavior based at least in part on the network page request 110. In other words, the session-level performance metric may be application specific and interpreted differently (i.e., according to differing thresholds) when certain types of network pages 111 are requested. As a non-limiting example, when a user is placing an order from a network site, the user may be particularly sensitive to increased latency times. For example, when a user enters credit card or other billing information, the user may be concerned that the payment may not have gone through when the network page server 121 is taking a longer time to generate the network page 111. Such an experience may be memorable for the user, such that the user may remember the bad experience and be reluctant to visit the same network site and or place an order with that network site in the future. By contrast, when a user requests a network page 111 with a video-on-demand feature, the user may be more tolerant of slower performance because of reduced performance expectations associated with streaming video over the network 109.

Consequently, it may be important for the network site control application 115 to ensure that increased performance is provided when certain network pages 111 are requested. Alternatively, or additionally, the network site control application 115 may modify the generation of a network page 111 to include reassurances based at least in part on the session-level performance metrics and the network page request 110.

Figure 2:
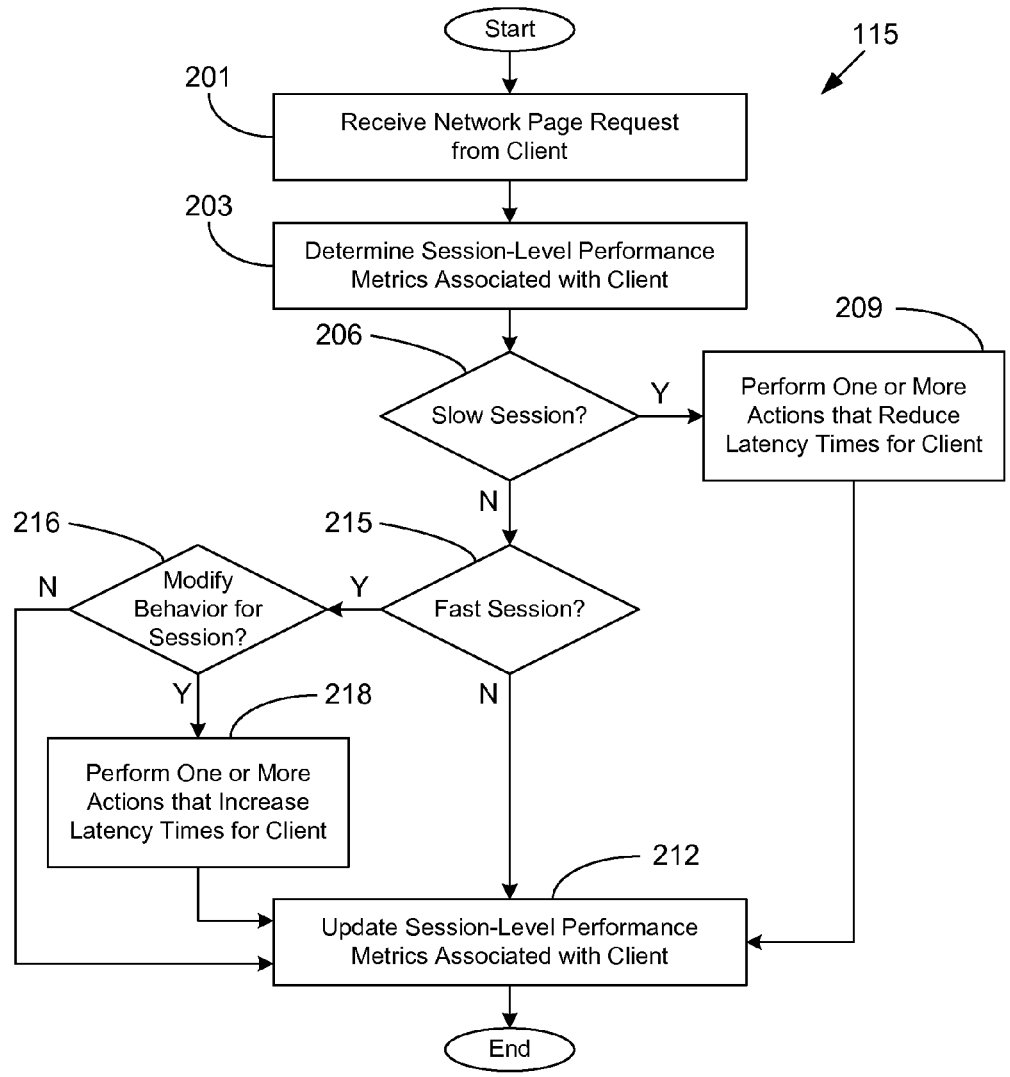
FIG. 2 is a flowchart illustrating one example of functionality implemented as portions of a network site control application executed in a computing resource in the networked environment of FIG. 1 according to the various embodiments of the present disclosure.

Referring next to FIG. 2, shown is a flowchart that provides one example of the operation of a portion of the network site control application 115 according to various embodiments. It is understood that the flowchart of FIG. 2 provides merely an example of the many different types of functional arrangements that may be employed to implement the operation of the portion of the network site control application 115 as described herein. As an alternative, the flowchart of FIG. 2 may be viewed as depicting an example of steps of a method implemented in the computing resource 103 (FIG. 1) according to one or more embodiments.

Beginning with box 201, the network site control application 115 receives a network page request 110 (FIG. 1) from a client 106 (FIG. 1) over the network 109 (FIG. 1). Thereafter, in box 203, the network site control application 115 determines one or more session-level performance metrics associated with the client 106. To this end, the network site control application 115 may retrieve data from user experience data 124 (FIG. 1) stored on the computing resource 103 (FIG. 1), obtain data from the client 106 stored in cookies 136 (FIG. 1), and/or obtain data relating to client latency times by some other mechanism.

In box 206, the network site control application 115 determines whether the user at the client 106 is having a slow session. In other words, the network site control application 115 determines from the aggregate latency times experienced by the client 106 over a session whether the network site hosted by the computing resource 103 is delivering acceptable performance. The aggregate latency times may be compared with one or more thresholds. If the network site control application 115 determines in box 206 that the user is having a slow session, then the network site control application 115 proceeds to box 209.

In box 209, the network site control application 115 performs one or more actions to reduce or shorten latency times for the client 106. To this end, the network site control application 115 may modify the generation of the network page 111 (FIG. 1), route the network page request 110 to a faster network page server 121 (FIG. 1) within a network page server pool 118 (FIG. 1), and/or perform other actions. It is understood that other tasks may be performed to decrease latency times in the computing resource 103 as needed. Thereafter, in box 212, the network site control application 115 updates the session-level performance metrics associated with the client 106. This updating may involve, for example, updating the user experience data 124, updating cookies 136, and/or updating other data according to the latest latency time for the client 106 determined by the computing resource 103 and/or the client 106. Finally, the network site control application 115 ends.

If, in box 206 the network site control application 115 determines that the user is not having a slow session, the network site control application 115 moves to box 215. In box 215, the network site control application 115 determines whether the user is having a fast session. In such a case, the session-level performance metrics may indicate that the session-level performance is faster than is necessary for the user to have a positive experience. The aggregate latency times may be compared with one or more thresholds. If, in box 215, the network site control application 115 determines that the user is experiencing a fast session, then the network site control application 115 moves to box 216.

In box 216, the network site control application 115 determines whether to modify the behavior of the network site for the session of the user. If the user is experiencing such a fast session that an increase in latency times would not be noticeable by the user or would not aggravate the user, it may be desired to take an action that would result in an increase in latency times. Such an action may free up processing, network, or other capacity to improve the experience of other users, may reduce operating expenses, or may produce some other benefit. If, in box 216, the network site control application 115 decides to modify the behavior of the network site for the session, the network site control application 115 moves to box 218.

In box 218, the network site control application 115 proceeds to perform one or more actions that may increase or lengthen latency times for the client 106. To this end, the network site control application 115 may modify the generation of the network page 111 requested by the client 106, route the network page request 110 to a slower network page server 121 within the network page server pool 118, and/or take some other action. The network site control application 115 may also perform other tasks that may ultimately increase latency times for the client 106. Next, the network site control application 115 proceeds to box 212 and updates the session-level performance metrics associated with the client 106. This updating may involve, for example, updating the user experience data 124, updating cookies 136, and/or updating other data according to the latest latency time for the client 106 determined by the computing resource 103 and/or the client 106. Finally, the network site control application 115 ends.

If, in box 216, the network site control application 115 decides not to modify the behavior of the network site for the session, the network site control application 115 proceeds to box 212 and updates the session-level performance metrics associated with the client 106. This updating may involve, for example, updating the user experience data 124, updating cookies 136, and/or updating other data according to the latest latency time for the client 106 determined by the computing resource 103 and/or the client 106. Finally, the network site control application 115 ends.

If, in box 215 the network site control application 115 determines that the user is not having a fast session experience, no modification of the network site behavior may be necessary. In such a case, the network site control application 115 moves to box 212 and updates the session-level performance metrics associated with the client 106. This updating may involve, for example, updating the user experience data 124, updating cookies 136, and/or updating other data according to the latest latency time for the client 106 determined by the computing resource 103 and/or the client 106. Finally, the network site control application 115 ends.

Figure 3:
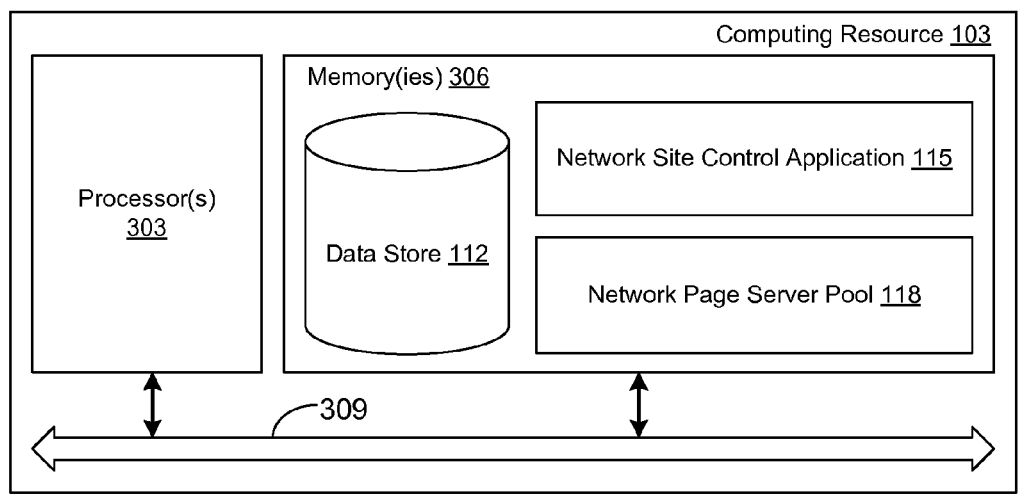
FIG. 3 is a schematic block diagram that provides one example illustration of a computing resource employed in the networked environment of FIG. 1 according to various embodiments of the present disclosure.

With reference to FIG. 3, shown is a schematic block diagram of the computing resource 103 according to an embodiment of the present disclosure. The computing resource 103 includes at least one processor circuit, for example, having a processor 303 and a memory 306, both of which are coupled to a local interface 309. To this end, the computing resource 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the network site control application 115, the network page server pool 118, and potentially other applications. Also stored in the memory 306 may be a data store 112 and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 109 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the network site control application 115, the network page server pool 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the network site control application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site control application 115, the network page server pool 118, that comprises software or code can be embodied in any computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
 at least one computing device; and
 at least one application executable in the at least one computing device, wherein when executed the at least one application causes the at least one computing device to at least:
  determine a session-level latency performance observed by a client across a session of accessing a network site, the session-level latency performance being determined from a plurality of latency times, individual ones of the plurality of latency times representing a time elapsed between a sending of a network page request in the client and a rendering in the client of a network page received from a network page service in response to the network page request;
  modify a response to a subsequent network page request from the client according to the session-level latency performance in order to adjust a subsequent latency time for the client;
  wherein modifying the response further comprises selecting a different network page service to respond to the subsequent network page request received from the client, the different network page service being selected according to the session-level latency performance in order to adjust the subsequent latency time for the client; and
 wherein the different network page service is associated with a slower response time than a network page service that otherwise would have been selected to respond to the subsequent network page request.

2. A system, comprising:
 at least one computing device; and
 at least one application executable in the at least one computing device, wherein when executed the at least one application causes the at least one computing device to at least:
  determine a session-level latency performance observed by a client across a session of accessing a network site, the session-level latency performance being determined from a plurality of latency times, individual ones of the plurality of latency times representing a time elapsed between a sending of a network page request in the client and a rendering in the client of a network page received from a network page service in response to the network page request;

modify a response to a subsequent network page request from the client according to the session-level latency performance in order to adjust a subsequent latency time for the client; and wherein the subsequent latency time is adjusted to be reduced in response to determining that at least a predetermined ratio of the plurality of latency times meet a threshold associated with a diminished user experience.

3. A system, comprising:

at least one computing device; and at least one application executable in the at least one computing device, wherein when executed the at least one application causes the at least one computing device to at least:

determine a session-level latency performance observed by a client across a session of accessing a network site, the session-level latency performance being determined from a plurality of latency times, individual ones of the plurality of latency times representing a time elapsed between a sending of a network page request in the client and a rendering in the client of a network page received from a network page service in response to the network page request;

modify a response to a subsequent network page request from the client according to the session-level latency performance in order to adjust a subsequent latency time for the client; and wherein the subsequent latency time is adjusted to be increased in response to determining that at least a predetermined ratio of the plurality of latency times exceed a threshold associated with an adequate user experience.

4. The system of claim 3, wherein modifying the response further comprises selecting a different network page service to respond to the subsequent network page request received from the client, the different network page service being selected according to the session-level latency performance in order to adjust the subsequent latency time for the client.

5. The system of claim 4, wherein the different network page service is further selected based at least in part on a spare capacity associated with the different network page service.

6. The system of claim 4, wherein the different network page service is further selected based at least in part on a cost associated with responding to the subsequent network page request.

7. The system of claim 2, wherein modifying the response further comprises selecting a different network page service to respond to the subsequent network page request received from the client, the different network page service being selected according to the session-level latency performance in order to adjust the subsequent latency time for the client; and wherein the different network page service is associated with a faster response time than a network page service that otherwise would have been selected to respond to the subsequent network page request.

8. The system of claim 3, wherein modifying the response further comprises modifying generation of a subsequent network page to include a network page component that causes a network page generation time to be increased.

9. The system of claim 2, wherein modifying the response further comprises modifying generation of a subsequent network page to omit a network page component that causes a network page generation time to be increased.

10. A method, comprising:

determining, via at least one of one or more computing devices, a session-level latency performance observed by a client across a session of accessing a network site, the session-level latency performance being determined from a plurality of latency times received from the client, individual ones of the plurality of latency times representing a time elapsed between a sending of a network page request in the client and a rendering in the client of a network page received from a network page service in response to the network page request;

prioritizing, via at least one of the one or more computing devices, a response to a subsequent network page request from the client according to the session-level latency performance in order to adjust a subsequent latency time for the client;

determining, via at least one of the one or more computing devices, a threshold based at least in part on a type of network page requested via the subsequent network page request; and determining, via at least one of the one or more computing devices, whether to increase or decrease the subsequent latency time by comparing the session-level latency performance to the threshold.

11. The method of claim 10, wherein prioritizing the response to the subsequent network page request further comprises selecting, via at least one of the one or more computing devices, a particular network page service from a plurality of network page services based at least in part on the session-level latency performance and a geographic location of the client.

12. The method of claim 10, wherein prioritizing the response to the subsequent network page request further comprises including, via at least one of the one or more computing devices, additional content in a requested network page based at least in part on the session-level latency performance.

13. The method of claim 10, wherein the subsequent latency time is adjusted to be reduced in response to determining that at least a predetermined ratio of the plurality of latency times meet a threshold associated with a diminished user experience.

14. A method, comprising:

determining, via at least one of one or more computing devices, a session-level latency performance observed by a client across a session of accessing a network site, the session-level latency performance being determined from a plurality of latency times received from the client, individual ones of the plurality of latency times representing a time elapsed between a sending of a network page request in the client and a rendering in the client of a network page received from a network page service in response to the network page request;

prioritizing, via at least one of the one or more computing devices, a response to a subsequent network page request from the client according to the session-level latency performance in order to adjust a subsequent latency time for the client; and wherein the subsequent latency time is adjusted to be increased in response to determining that at least a predetermined ratio of the plurality of latency times exceed a threshold associated with an adequate user experience.

15. The method of claim 10, wherein the individual ones of the plurality of latency times include at least one of:
a service-side latency component, a client-side latency component, or a network latency component.

16. A non-transitory computer-readable medium embodying a program executable in at least one computing device, wherein when executed the program causes the at least one computing device to at least:
receive a plurality of latency times from a client;
determine a session-level latency performance observed by the client across a session of accessing a network site, the session-level latency performance being determined from the plurality of latency times, individual ones of the plurality of latency times representing a time elapsed between a sending of a network page request in the client and a rendering in the client of a network page received from a network page service in response to the network page request;
determine that the session-level latency performance exceeds a threshold associated with an adequate user experience; and
modify a response to a subsequent network page request received from the client in order to increase a subsequent latency time.

17. The non-transitory computer-readable medium of claim 16, wherein modifying the response comprises selecting a slower network page service than otherwise would have been selected to respond to the subsequent network page request received from the client.

18. The non-transitory computer-readable medium of claim 16, wherein modifying the response comprises modifying a generation of a subsequent network page in response to the subsequent network page request to include at least one additional content item in the network page that would increase a network page generation time.

19. The non-transitory computer-readable medium of claim 16, wherein the individual ones of the plurality of latency times include at least one of:
a service-side latency component, a client-side latency component, or a network latency component.

20. The non-transitory computer-readable medium of claim 17, wherein the slower network page service is further selected based at least in part on a cost associated with responding to the subsequent network page request.

* * * * *